Patented Mar. 10, 1953

2,631,148

UNITED STATES PATENT OFFICE 2,631,148

MANUFACTURE OF TRIALLYL CYANURATE

Robert G. Nelb, Naugatuck, Conn., assignor to United States Rubber Company, New York, N. Y., a corporation of New Jersey No Drawing. Application April 10, 1951, Serial No. 220,369

4 Claims. (Cl. 260—248)

This invention relates to an improved process of making triallyl cyanurate.

This said chemical is useful as a cross-linking agent for unsaturated polyester alkyds and various methods have been proposed for its manufacture as shown by U. S. Patents Nos. 2,510,564 and 2,537,816. Such prior methods are fraught with various complications and disadvantages, and usually result in relatively low yields of trialyll cyanurate.

An object of this invention is to provide an improved method of making triallyl cyanurate by which it can be readily and economically produced in relatively high yield and purity, and in a simple manner. Other objects will be apparent from the hereinafter description.

According to the invention, a slurry of one mol of cyanuric chloride in excess of three mols of allyl alcohol is first prepared, using preferably as an added diluent an inert organic solvent such as toluene. Three mols of allyl alcohol are necessary for the present reaction, but an excess thereof, even substantial excess, does not interfere with the reaction which is illustrated as follows:

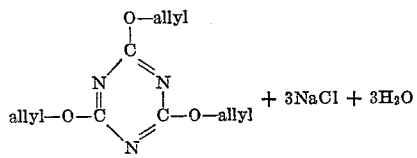

In this invention, at least three mols of sodium hydroxide in the form of an aqueous concentrated solution, e. g., on the order of about 40 to about 50%, by weight, concentration, is thereafter slowly added, with vigorous stirring to the aforesaid mixed solution, at a rate such that the temperature does not rise above 10° C. The mixed solution, before the addition of the concentrated aqueous solution of the sodium hydroxide, can be cooled to a temperature in the range of about zero to about minus ten degrees centigrade which aids in maintaining the reaction temperatures below 10° C.

The reaction mix, on completion of the reaction, is washed with water to remove sodium chloride, excess allyl alcohol, and any unreacted sodium hydroxide, from association with the formed triallyl cyanurate.

The resulting solution, containing the inert solvent and the triallyl cyanurate, may be placed on a steam bath and subjected to reduced pressure to remove the inert organic solvent, or other methods may be used to separate or recover the solvent from the triallyl cyanurate. The residue, after removal of the solvent, consists of almost water-white triallyl cyanurate. The yield of the triallyl cyanurate runs approximately 92% based on the active cyanuric chloride used.

Exemplary of other suitable liquid inert diluents, besides toluene, are hydrocarbons such as benzene, xylene, hexane, heptane, etc., ethers such as diethyl ether, dibutyl ether, etc., and many other inert water-insoluble organic solvents which can be used equivalently to the toluene for dissolving and separating the formed triallyl cyanurate from water in the reaction mix.

The inert diluent also provides fluidity to the reaction mixture, permits use of less allyl alcohol above the three mol minimum, and facilitates the separation of the triallyl cyanurate from the aqueous phase, following the dilution of the reaction mixture with water.

The following example is given to illustrate the invention, parts being by weight:

Example 1

In a 3 l. three-necked flask carrying a dropping funnel, stirrer and thermometer are placed cyanuric chloride (555 g., 3 m.; assay 96% active), allyl alcohol (800 g., 13.8 m.) and toluene (500 ml.). The mixture is cooled to −10° C. and a 45% solution of sodium hydroxide (375 g., 9 m.; 96% assay) is added dropwise at such a rate that the temperature never exceeds 10° C. The reaction mixture is stirred as vigorously as possible to prevent any sudden exotherm which may be caused by a build-up in unreacted caustic solution. The addition of the sodium hydroxide solution required about three hours. After the addition of the sodium hydroxide and completion of the reaction, the reaction mixture is washed twice or more with equal volumes of water to remove the sodium chloride, excess allyl alcohol and what little excess caustic which may have been present. The resulting toluene solution is placed on a steam bath and subjected to reduced pressure to remove the toluene. There is obtained 660 g. (85.5% yield, or 92% yield based on active cyanuric chloride used) of almost water-white triallyl cyanurate, freezing point 27° C. (29° C. is obtainable with analytically pure starting material).

Having thus described my invention, what I claim and desire to protect by Letters Patent is:

1. A method of preparing triallyl cyanurate which comprises adding at least three mols of alkali-metal hydroxide in the form of a concentrated aqueous solution, to a slurry of one mol of cyanuric chloride in excess of three mols of allyl alcohol, and carrying out the reaction at a temperature not in excess of 10° C.

2. A method of preparing triallyl cyanurate which comprises adding at least three mols of sodium hydroxide in the form of a concentrated aqueous solution, to a slurry of one mol of cyanuric chloride in excess of three mols of allyl alcohol, and carrying out the reaction at a temperature not in excess of 10° C., and thereafter washing the reaction mixture with water until substantially free of sodium chloride, unreacted allyl alcohol and unreacted sodium hydroxide.

3. A method as set forth in claim 2 in which the slurry of cyanuric chloride in allyl alcohol contains a water-insoluble inert organic solvent diluent.

4. A method of preparing triallyl cyanurate which comprises adding at least three mols of sodium hydroxide in the form of a concentrated aqueous solution, to a slurry of one mol of cyanuric chloride in excess of three mols of allyl alcohol, said second solution containing, in addition, a water-insoluble inert organic solvent diluent capable of dissolving triallyl cyanurate, carrying out the reaction at a temperature not in excess of 10° C., and thereafter washing the reaction mixture with water until substantially free of sodium chloride, unreacted allyl alcohol and unreacted sodium hydroxide, and subsequently removing the water-insoluble organic diluent solvent and recovering substantially pure triallyl cyanurate.

ROBERT G. NELB.

REFERENCES CITED

The following references are of record in the file of this patent:

UNITED STATES PATENTS

| Number | Name | Date |
|---|---|---|
| 2,510,564 | Dudley | June 6, 1950 |
| 2,537,816 | Dudley | Jan. 9, 1951 |